(12) United States Patent
Takahashi

(10) Patent No.: US 8,164,648 B2
(45) Date of Patent: Apr. 24, 2012

(54) IMAGE PROCESSING APPARATUS AND IMAGE PROCESSING APPARATUS CONTROL METHOD

(75) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 948 days.

(21) Appl. No.: 11/872,948

(22) Filed: Oct. 16, 2007

(65) Prior Publication Data

US 2008/0174673 A1    Jul. 24, 2008

(30) Foreign Application Priority Data

Oct. 26, 2006   (JP) ................. 2006-291721

(51) Int. Cl.
*H04N 9/73* (2006.01)
*G06K 9/00* (2006.01)
(52) U.S. Cl. ............... 348/223.1; 358/516; 382/167
(58) Field of Classification Search .......... 348/223.1, 348/231.3
See application file for complete search history.

(56) References Cited

U.S. PATENT DOCUMENTS

| 2001/0035909 A1 | 11/2001 | Kubo |
| 2002/0054220 A1 | 5/2002 | Takeuchi |
| 2002/0130959 A1 | 9/2002 | McGarvey |
| 2003/0112342 A1 | 6/2003 | Takeuchi |
| 2004/0095478 A1 | 5/2004 | Takano |

FOREIGN PATENT DOCUMENTS

| EP | 0862335 A | 9/1998 |
| JP | 2003-324746 A | 11/2003 |
| JP | 2004-304712 | 10/2004 |

OTHER PUBLICATIONS

Feb. 22, 2008 extended European Search Report of the counterpart European Patent Application No. 07119439.3.
Oct. 29, 2010 European Summons to attend oral proceedings of the counterpart European Patent Application No. 07119439.3.

*Primary Examiner* — Ngoc-Yen Vu
(74) *Attorney, Agent, or Firm* — Cowan, Liebowitz & Latman, P.C.

(57) ABSTRACT

An image processing apparatus is provided in which all WB coefficient values are calculated rather than only WB coefficient values of a default light source, then a result thereof is associated with intermediate raw data and stored. Further still, when a user gives instruction for a change in a light source setting when carrying out WB readjustments on a personal computer (407) or the like, WB coefficient values corresponding to the selected light source are read in from among all the WB coefficient values that have been associated with the intermediate raw data and applied to the intermediate raw data.

7 Claims, 13 Drawing Sheets

F I G. 8
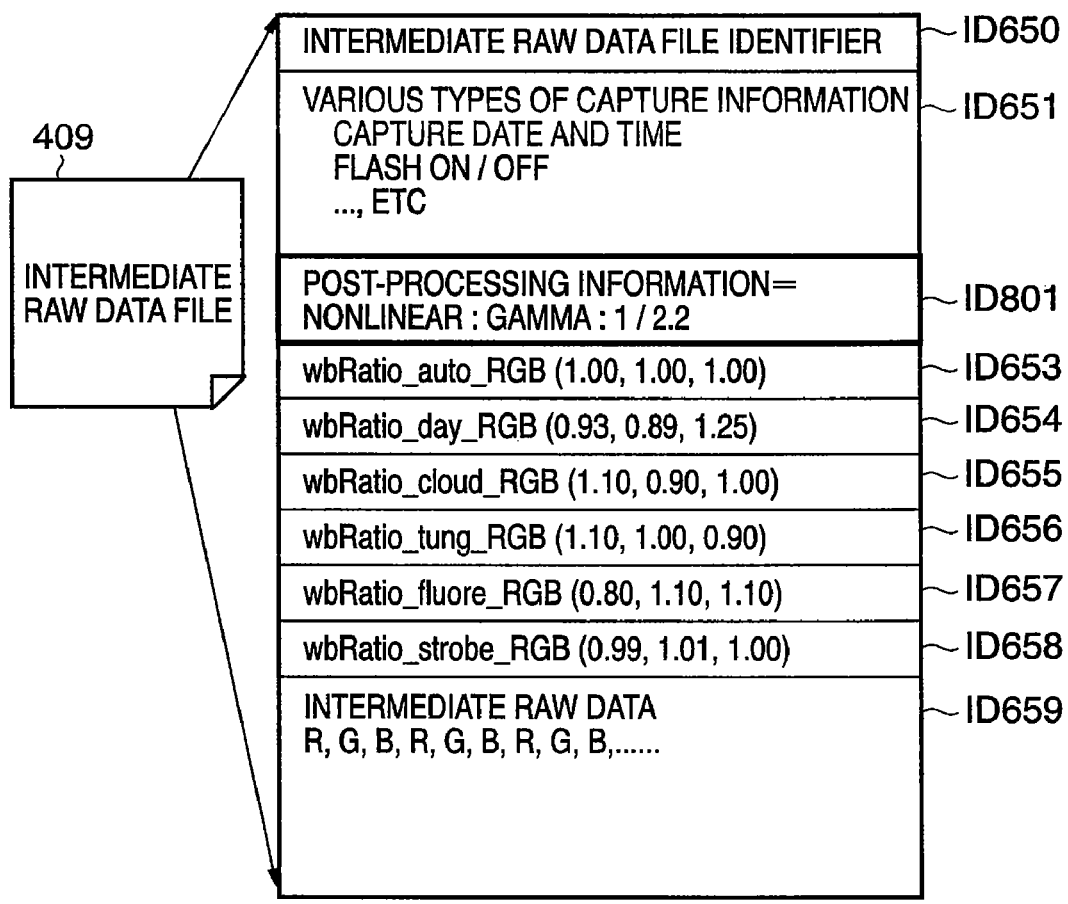

IMAGE PROCESSING APPARATUS AND IMAGE PROCESSING APPARATUS CONTROL METHOD

BACKGROUND OF THE INVENTION

1. Field of the Invention

The present invention relates to image processing apparatuses and image processing methods, and in particular those used in saving image data obtained by capture with an imaging device such as a digital camera or the like.

2. Description of the Related Art

Currently, centering on single-lens reflex cameras, it is usual for the following two types of data to be selectable in digital cameras when recording in order to save image data obtained by imaging. That is, JPEG data as general-purpose image data in which general image processes (hereinafter referred to as "development processing") for use as an image for viewing and compression processes have all been carried out, and raw data from the imaging device, which is generally referred to as raw data.

The former, JPEG data, has the following advantages. Since the compression ratio of image data is higher for JPEG data compared to raw data, it involves saving a smaller amount of data. Consequently, a large number of JPEG images can be saved on recording media such as semiconductor memory cards. Furthermore, JPEG data is highly usable data that can be decoded on many platforms including commonly used PCs (personal computers) and digital televisions and can be displayed for viewing.

On the other hand, despite the large data size, raw data has the following advantages. Namely, raw data is image data in which the raw data from the imaging device is faithfully saved. Consequently, it is possible to record and save the tones (bit depth) of image data obtained directly from the imaging device as they are. For example, with JPEG data, the image data from the imaging device that has been quantized at 12 bits undergoes tone compression down to 8 bits, but raw data is saved and recorded as it is at 12 bits.

When simply subjecting raw data to electrical development processing for display on a display device, the difference with JPEG data is difficult to judge. However, when printing with raw data, a printing result having excellent tonality and a high color range can be achieved by performing development processing that matches the color range of the printer to be used. Moreover, there is little effect of image deterioration when image processing is performed and it has strong durability as image information. Thus it has a major advantage in that it is unlikely for image processing to cause tone jump or tonal loss.

Depending on the digital camera maker, specialized software is commercially available that enables fundamentally the same development processing of a digital camera to be achieved on a PC. By using such specialized software, the various types of parameters for development (hereinafter referred to as "development parameters") that are set in a digital camera at the time of capture can be reset on a PC to perform development processing on the raw data. Consequently, even when incorrect development parameters are used at the time of capture for example, if capture is performed using a raw data format, it is possible to perform development processing on a PC using appropriate development parameters. For this reason, raw data formats are currently widely used particularly among professional photographers who intend to use the image data, which they have obtained by capture, by processing it on a PC.

However, ordinary platforms (such as PCs and digital televisions) do not have a means for viewing raw data as an image. In this sense it can be said that raw data has poor usability. Consequently, ordinarily a user will install on a PC specialized application software for raw data and will only be able to view the raw data after the specialized application has executed development processing on the raw data. Thus there is a problem for the user in that it takes time and effort to view raw data.

If development processing functions were provided in each OS and each type of retouching software and the like, the time and effort of installing a specialized application could be eliminated. However, to obtain a development processing result having high picture quality, it would be necessary to develop development processing functions for each model of digital camera (or each model group having similar characteristics). This would result in development costs increasing undesirably.

To combat this problem, Japanese Patent Laid-Open No. 2004-304712 divides development processing functions into a portion (model-specific development processing portion) in which processing specific to the model (or model group) is carried out, and a portion (general purpose development processing portion) in which processing that is not dependent on the model is carried out. Also a configuration is disclosed in which a processing result of the model-specific development processing portion is outputted as intermediate format image data (hereinafter referred to as "intermediate raw data") and this result is inputted to the general purpose development processing portion.

With this configuration, if developers of each OS and retouching software on PCs first develop a general purpose development processing portion, then it is possible achieve high picture quality development processing for each digital camera by developing only the model-specific development processing portion. Or it would be possible for each digital camera maker to provide only the model-specific development processing portion, which would be incorporated into each OS and retouching software. In this way, image processing more specific to each digital camera is carried out using the model-specific development processing portion and an image processing result having high picture quality can be obtained by processing this result using the general purpose development processing portion.

By configuring in this manner, the user is able to use only the general purpose imaging processing application that he/she is used to using, and high picture quality development processing can be carried out on raw data from digital cameras of various models of various makers.

Data processing of raw data on a PC involves the user changing the development parameters in image processing application software (hereinafter referred to as "development processing software") that is capable of development processing. For example, when the contrast in image data obtained by capture is insufficient, the user increases the contrast value at the user interface (hereinafter referred to as "UI") of the development processing software. Upon doing this, development processing is carried out on the raw data by the development processing software using the contrast parameters that have been updated, the result of which is displayed on the UI. Then, when a satisfactory development processing result is achieved, it is common for the development processing result to be savable as general purpose image data such as TIFF and JPEG or the like. It should be noted that when first displaying raw data, which has been arbitrarily obtained by capture, with development processing software, it is common that the result is displayed by carrying out development processing using the development parameters that have been set on the digital camera side.

Development parameters capable of being set in this manner vary more or less depending on the development processing software, but as one example the following parameters can be set.

Parameters are listed below as [Development parameter item name: selectable item value]

[White balance: auto, day light, cloud, tungsten, fluorescent, strobe]

[Tone curve: such as indicating points on a spline curve on X and Y axes]

[Contrast: −5 to +5] (0 is default, stronger contrast for greater values)

[Sharpness: −5 to +5] (0 is default, edges more strongly emphasized for greater values)

[Color density: −5 to +5] (0 is default, higher saturation for greater values)

When anticipating these parameters, the details to be processed for items such as the tone curve, contrast, sharpness, and color density are comparatively definite, and they are processing details that have little dependency on each model and can be made readily adapted for multiple uses. Furthermore, in terms of the processing details, even when these processing details are performed as post-processing at a stage after development processing on RGB data for viewing, these processing details have little effect on picture quality as long as the bit depth can be maintained. Image processing details such as these that have little dependency on model are the processing details to be processed by the general purpose development processing portion provided in the configuration disclosed Japanese Patent Laid-Open No. 2004-304712.

On the other hand, in regard to white balance processing, highly precise white balance adjustments can be carried out using characteristics of each model, and the precision of white balance is an important factor for the performance of a digital camera. Accordingly, development processing results having higher picture quality can be obtained by performing processing in the model-specific development processing portion, in which a large number of the results of algorithm research and development by various digital camera makers is incorporated and that is provided by the various digital camera makers.

Although the absorption of a wide range of model-specific characteristics and the incorporation of very good algorithms is implemented from various digital camera makers, a basic flow of white balance adjustment processing is as shown in an example below.

First, an optical black value is subtracted from the raw data as required. Next, when there is unevenness in color gain in each individual digital camera, an adjustment value is referenced to normalize the unevenness in color gain.

Next, the raw data is divided into a plurality of blocks having a predetermined width and height, and a color evaluation value is calculated for each block as shown in expression 1 below. It should be noted that expression 1 below is an example of a conversion formula in a case of primary color signals.

$$Cx=(R-B)/Y$$

$$Cy=(R+B-2G)/Y$$

$$Y=(R+G+B)/2 \qquad \text{expression 1}$$

Here, when color evaluation values (Cx, Cy) are contained in a "white detection area that is preset for each light source", that block is assumed to be white. Then, integration values of each color pixel (SumR, SumG, and SumB) are calculated respectively for each block assumed to be white. From the thus-calculated integration values, white balance gain (white balance coefficient values) kWB_R, kWB_G, and kWB_B are calculated using expression 2 shown below.

$$kWB\_R=k\times(SumR+SumG+SumB)/SumR$$

$$kWB\_G=k\times(SumR+SumG+SumB)/SumG$$

$$kWB\_B=k\times(SumR+SumG+SumB)/SumB \qquad \text{expression 2}$$

Here, k may be set such that overall gain becomes a preferable value.

It should be noted that "white detection area that is preset for each light source" refers to an area that is determined for each light source such as day light, fluorescent, tungsten and the like, and is calculated from one or a range of a plurality of color temperatures.

The range of color temperatures predetermined for each light source involves details of algorithm development strived for by each digital camera maker for the best values and involves details for tuning development processing parameters. Furthermore, even when a digital camera is set to "day light" for example, the color temperature of the light source varies due to conditions such as time, direction, and weather as shown below.

Sky light: 18,000 to 12,000 K (K=Kelvin)
North side sky in fine weather: 12,000 K
Noon sunlight: 5,300 K
Sunrise or sunset: 3,500 to 2,700 K In other words, when the light source is set to "day light", white detection is carried out in regard to a plurality of white detection areas calculated from the above plurality of color temperature ranges, and after obtaining the most probable color temperature from among the above, it is necessary to calculate SumR, SumG, and SumB for the corresponding white detection areas.

FIG. 1 shows an example of a white detection area when there is a setting of "light source=auto". When there is an auto setting, it is necessary to perform white detection ranging across all color temperatures. For this reason, white is captured at each arbitrary color temperature step under light sources ranging from a high color temperature to a low color temperature, then color evaluation values are calculated from signal values obtained from the imaging device, and these are plotted. In this way, white determination lines (white detection axes) are generated from a high color temperature to a low color temperature as shown in FIG. 1. In fact, since there is slight unevenness in light separation even for white, a range enclosed by the dotted lines having a slight width from the obtained white determination line is used as the white detection area at times of the auto setting. At times when the light source is other than the auto setting, a corresponding range of one or a plurality of color temperatures within FIG. 1 is set as the white detection area.

When carrying out highly precise white balance adjustments with the example of the above white balance coefficient value calculation method, rather than using white balance coefficient values that are predetermined for each light source, it is necessary to obtain white balance coefficient values from a result of referencing the content of the image data.

Furthermore, for white balance, it is necessary to obtain a white detection area from observed values for each model (or model group) of digital camera. Consequently, each digital camera maker sets the performance thereof as an important feature of the digital camera, and is advancing research and development in algorithms and tuning parameters. Also in this sense, to carry out very highly precise white balance adjustments, it is preferable that the white balance coefficient value calculation processing is performed by the "model-specific development processing portion" in the configuration of the aforementioned Japanese Patent Laid-Open No. 2004-304712.

However, for image data in which white balance (hereinafter referred to as "WB") processing has been performed by the model-specific development processing portion and outputted as intermediate raw data, it is desirable to readjust WB using the general purpose development processing portion even when highly precise WB adjustment has already been performed.

For example, reasons for this include:

1) Capturing was performed using the auto setting and development processing has been performed, but a color cast has occurred, and therefore it is desired to reset to the actual light source at the time of capture. That is, although the precision in the latest WB processing has improved and it is possible to achieve appropriate WB adjustments for many types of image data, in cases such as where there is absolutely no white areas in the image data, there is a possibility that a color cast will occur in the processing result for image data under the auto setting. In cases such as where capture was performed with the light source setting of the digital camera set to the auto setting and color a cast has occurred in the result of processing in the model-specific development processing portion with the auto setting, a demand arises for WB readjustments using the general purpose development processing portion.

2) Capturing was performed using the auto setting and development processing has been performed, but it is desired to retain a certain atmosphere and therefore it is desired to reset to day light. For example, in cases such as where capture was performed using a candle flame as a light source, there are times when the WB adjustment result under the auto setting is insufficient for the atmosphere of the photo. In cases such as where it is desired to retain the candlelight atmosphere and reproduce the photo with coloring in which white subjects are shifted to warmer color types, it becomes necessary to readjust WB once again under a setting of day light or the like.

3) There was a mistake in the light source setting at the time of capture and therefore it is desired to reset to the actual light source at the time of capture. For example, there are cases where the user undesirably carries out capture by inadvertently leaving the setting on the digital camera to a light source that is different from the actual light source. In such cases, it becomes necessary to reset the light source to that of the time of capture for WB result that was automatically processed by the model-specific development processing portion, then once again carry out WB readjustments using the general purpose development processing portion.

However, the WB algorithms and tuning parameters of the model-specific development processing portion do not conventionally reside in the general purpose development processing portion. For this reason, conventional techniques have been unable to carry out WB readjustment processes making use of the algorithms and tuning parameters of the model-specific development processing portion.

SUMMARY OF THE INVENTION

Accordingly, the present invention provides an image processing apparatus in which WB readjustment processing having high picture quality is made possible for intermediate raw data that has already undergone WB correction.

According to one aspect of the present invention, an image processing apparatus, comprises:

a first white balance coefficient value calculation unit configured to calculate a first white balance coefficient value for a first light source that has been set in relation to raw data;

a second white balance coefficient value calculation unit configured to calculate a second white balance coefficient value for a light source other than the first light source in relation to the raw data;

an intermediate raw data generation processing unit configured to generate intermediate raw data by applying the first white balance coefficient value to the raw data; and a storage unit configured to store as white balance information, information capable of specifying the second white balance coefficient value, associated with the generated intermediate raw data.

According to another aspect of the present invention, an image processing apparatus, comprises:

a storage unit for storing intermediate raw data, which has been obtained by multiplying raw data by a first white balance coefficient value for a set light source, and white balance information relating to the raw data for a light source setting other than the set light source;

a light source setting selection unit for selecting a new light source setting; and an image data generation processing unit for generating image data in which white balance readjustment has been performed using the intermediate raw data, wherein the image data generation processing unit performs generation processing of image data in which white balance readjustment has been performed in accordance with the white balance information for the selected light source setting based on the intermediate raw data when a light source setting has been selected other than the set light source using the light source setting selection means.

According to still another aspect of the present invention, an image processing apparatus control method, comprises the steps of:

calculating a first white balance coefficient value for a first light source that has been set in relation to raw data;

calculating a second white balance coefficient value for a light source other than the first light source in relation to the raw data; generating intermediate raw data by applying the first white balance coefficient value to the raw data; and storing as white balance information, information capable of specifying the second white balance coefficient value, associated with the intermediate raw data.

According to yet another aspect of the present invention, an image processing apparatus control method, comprises steps of:

storing in a storage unit intermediate raw data, which has been obtained by multiplying raw data by a first white balance coefficient value for a set light source, and white balance information relating to the raw data for a light source setting other than the set light source;

selecting a new light source setting; and generating image data in which white balance readjustment has been performed using the intermediate raw data, wherein the step of generating the image data involves performing generation processing of image data in which the white balance readjustment has been performed in accordance with the white balance information for the selected light source setting based on the intermediate raw data when a light source setting has been selected other than the set light source in the step of selecting the light source setting.

With the present invention, it is possible to carry out white balance readjustment processing having high picture quality for intermediate raw data that has already undergone white balance correction.

Further features of the present invention will become apparent from the following description of exemplary embodiments with reference to the attached drawings.

BRIEF DESCRIPTION OF THE DRAWINGS

FIG. 8 shows a file format of an intermediate raw data file in an image processing apparatus according to another preferred embodiment of the present invention.

DESCRIPTION OF THE EMBODIMENTS

Figure 1:
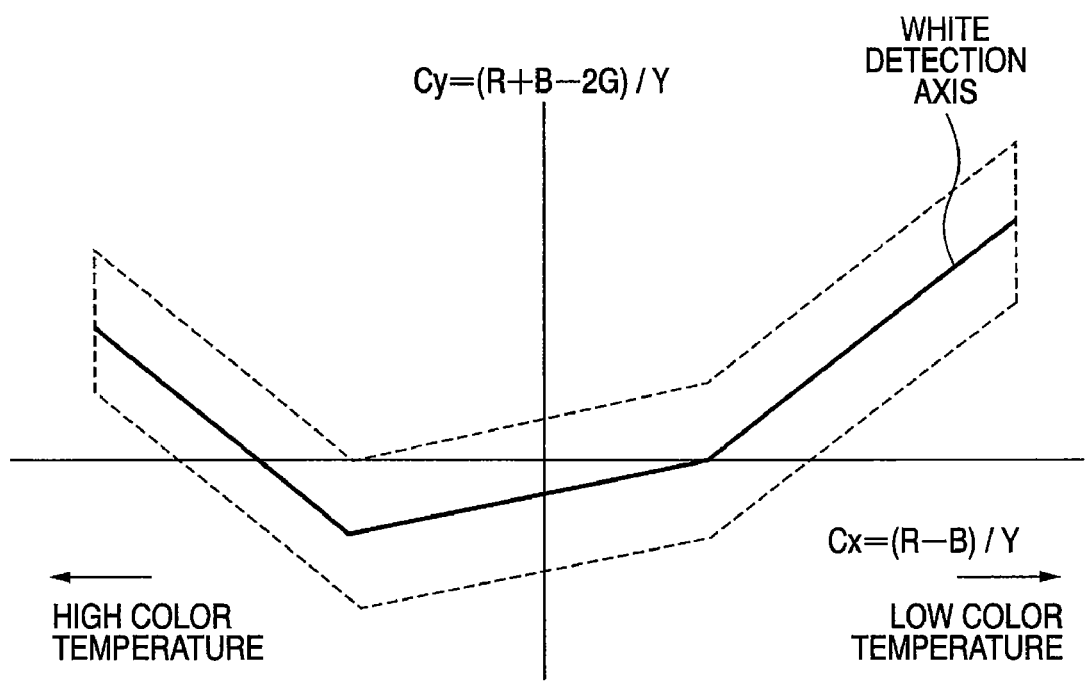
FIG. 1 shows an example of a white detection area when there is an auto setting in an image processing apparatus according to a preferred embodiment of the present invention.
Figure 2:
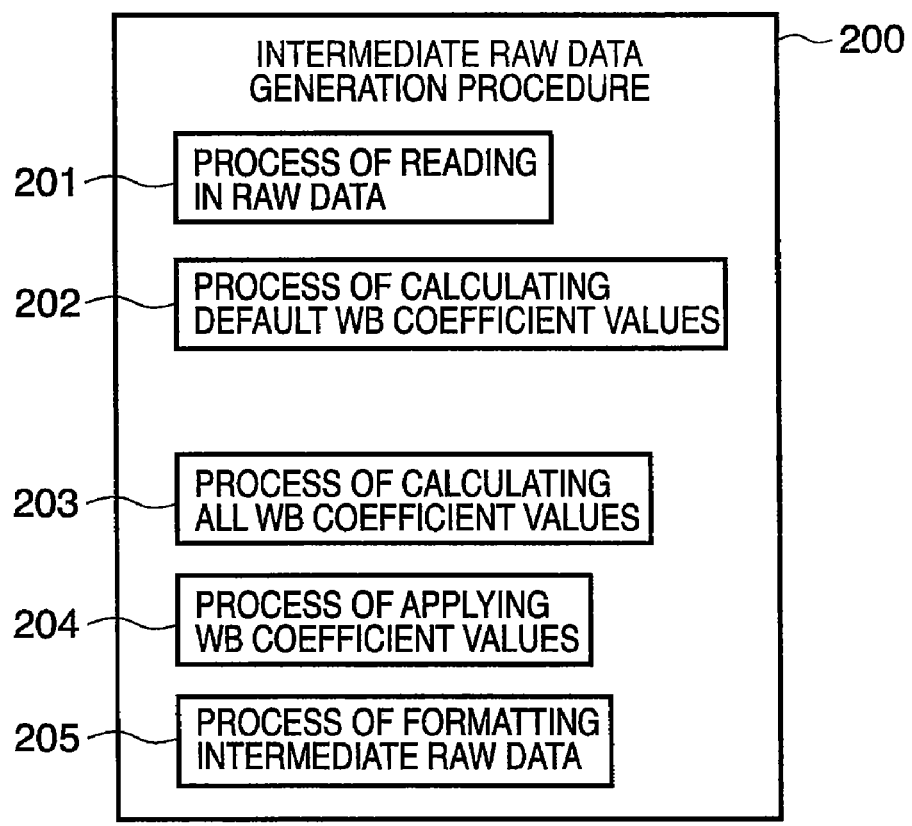
FIG. 2 is a schematic diagram that describes a procedure for generating intermediate raw data in an image processing apparatus according to a preferred embodiment of the present invention.
Figure 3:
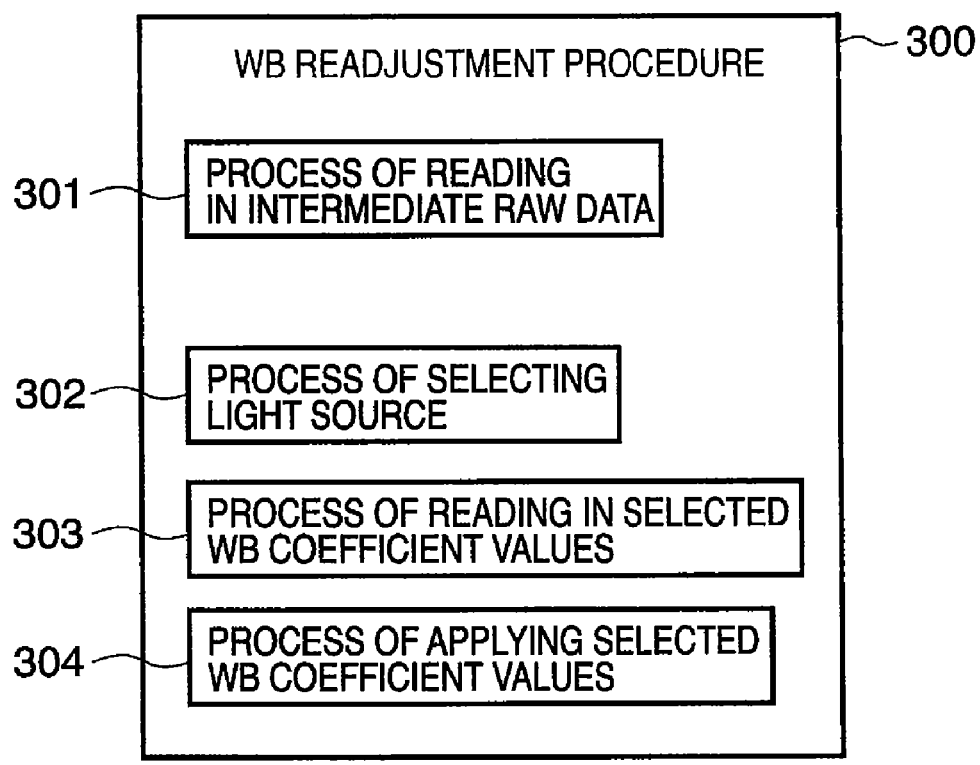
FIG. 3 is a schematic diagram that describes a procedure for performing WB readjustment in an image processing apparatus according to a preferred embodiment of the present invention.

In an image processing apparatus according to a preferred embodiment of the present invention, with a configuration shown in FIG. 2 and FIG. 3, all WB coefficient values are calculated in a model-specific image processing unit rather than only WB coefficient values according to a default light source, then the calculated results are stored associated with intermediate raw data. Then, when WB readjustments are carried out in a general purpose image processing unit, a user indicates a light source setting change using a light source selection portion. Then WB coefficient values corresponding to the selected light source are read in from among all the WB coefficient values that have been associated with the intermediate raw data and applied to the intermediate raw data that has been stored. In this way, highly precise WB readjustments are possible making use of the algorithms and tuning parameters of model-specific image processing.

Concepts of preferred embodiments of the present invention are described below in greater detail using FIG. 2 and FIG. 3.

FIG. 2 schematically shows an intermediate raw data generation procedure 200 in a model-specific development processing unit, executed in an image processing apparatus according to a preferred embodiment 1 of the present invention.

In FIG. 2, in a process of reading in raw data indicated by numeral 201, reading in of original raw data is carried out as a base for generating intermediate raw data. In a process of calculating default WB coefficient values indicated by numeral 202, the content of the original raw data that has been read in is referenced and a process is carried out of calculating WB coefficient values according to the default light source settings. Here, a light source or the like that was set when capture was performed with a digital camera is used as the default light source setting for the default light source setting of the process 202 of calculating default WB coefficient values. When no light source setting information is available for the time of capture, it is preferable that the "auto" setting is used as the default setting.

Furthermore, in a process of calculating all WB coefficient values indicated by numeral 203, the content of the original raw data that has been read in is referenced and WB coefficient values are calculated for all light source settings that can be calculated in the intermediate raw data generation procedure 200. Here, the WB coefficient values other than the default WB coefficient values are not limited to gain multiplied for the original raw data or each of the color components of the intermediate raw data. These may be ratios of the default WB coefficient values to each of the other WB coefficient values, and herein referring to "WB coefficient values" also includes ratios to other values.

Next, in a process of applying the WB coefficient values indicated by numeral 204, the default WB coefficient values are applied to the original raw data that was read in by the process 201 of reading in raw data.

In a process 205 of formatting intermediate raw data, associations are made between the default WB coefficient values calculated in the process 202 of calculating default WB coefficient values and all the WB coefficient values calculated in the process 203 of calculating all WB coefficient values as well as the intermediate raw data generated by the process 204 of applying the WB coefficient values. Then processing is completed by storing these as intermediate raw data files.

Next, detailed description is given using FIG. 3 in regard to an operation of a general purpose development processing unit provided in an image processing apparatus according to a preferred embodiment 2 of the present invention. FIG. 3 schematically shows a WB readjustment procedure 300 in the general purpose development processing unit. In FIG. 3, in a process of reading in intermediate raw data indicated by numeral 301, reading in of intermediate raw data as a target for WB readjustment is carried out. A process of selecting a light source indicated by numeral 302 is a process in which a user selects a new light source setting for updating the WB light source setting value, and includes a user interface for this purpose. When the light source set by the user is changed in the process 302 of selecting a light source, WB coefficient values (selected WB coefficient values) corresponding to the light source that has been selected and set are selected and obtained in a process 303 of reading in selected WB coefficient values from among all the WB coefficient values that are associated with intermediate raw data. The coefficient values are stored with the intermediate raw data.

Next, in a process 304 of applying the selected WB coefficient values, the selected WB coefficient values are applied to the intermediate raw data after a predetermined conversion has been carried out as required on the selected WB coefficient values, and WB readjustment is executed.

With a configuration of an image processing apparatus according to the preferred embodiment of the present invention described above, it is possible to carry out highly precise WB readjustments making use of the algorithms and tuning parameters of model-specific development processing.

Next, more detailed description is given concerning an image processing apparatus according to a preferred embodiment of the present invention.

Figure 4:
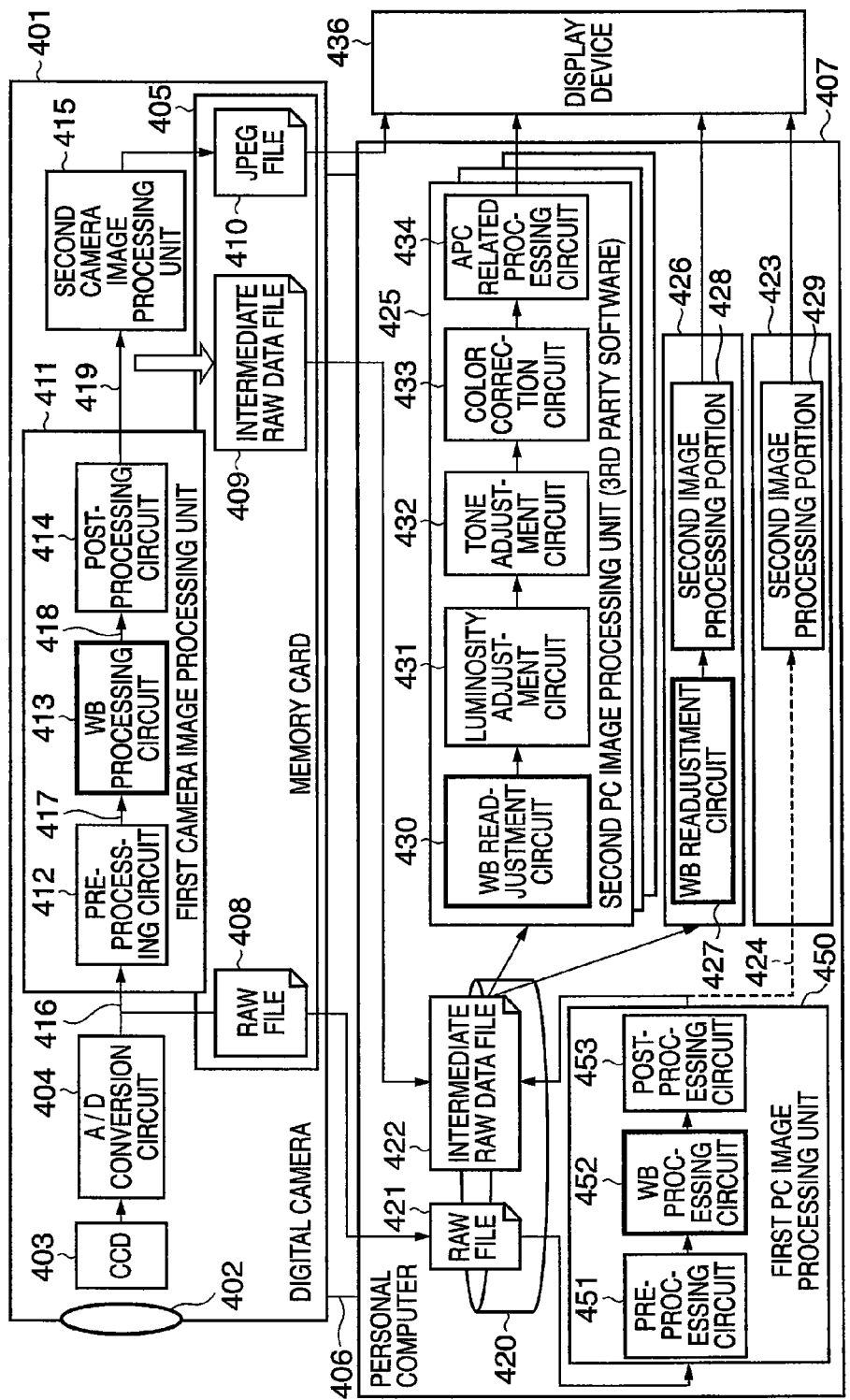
FIG. 4 shows an overall system configuration of an image processing apparatus according to a preferred embodiment of the present invention.

FIG. 4 is a block diagram showing a system in which a personal computer (hereinafter referred to as "PC"), which is an image processing apparatus according to a preferred embodiment of the present invention, and a digital camera are connected by a communications channel 406 such as a USB.

In FIG. 4, numeral 401 indicates a digital camera, which includes a lens 402, a CCD 403, and an A/D conversion circuit 404, and although not shown in the diagram, other structural elements that constitute the digital camera 401 are equivalent to a current ordinary digital camera.

Numeral 405 indicates a detachable semiconductor memory card for example, and is a storage medium for saving image data such as intermediate raw data, which is obtained by capture, after predetermined processing has been carried out. The image data saved in the storage medium 405 is again transferable to a PC 407 via a communications medium 406 such as a USB cable.

In the data stored in the storage medium 405, numeral 408 indicates a raw file in which raw data (original raw data) 416 is saved in a file of a predetermined type. The raw file 408 is a file in which raw data 416, in which predetermined processing such as reversible compression processing and attribute information assigning is carried out on image data that has undergone A/D conversion by the A/D conversion circuit 404 using an unshown means, is saved in a file system such as FAT32.

Also, the type of image data to be captured is able to be preset by the user in a menu of the digital camera 401. With this setting, the type of file to be used for saving can be switched in accordance with the user's setting such as the raw file 408, an intermediate raw data file 409, and a JPEG file 410 and the like. It should be noted that, as described earlier, the JPEG file 410 is data that is viewable on general purpose devices and is general purpose image data.

<Embodiment 1>

Numeral 411 indicates a first camera image processing unit corresponding to the model-specific development processing unit that executes the intermediate raw data generation procedure 200, which is executed in the image processing apparatus according to the preferred embodiment 1 of the present invention described in FIG. 2. Raw data 416 from the A/D conversion circuit 404 is supplied to the first camera image processing unit 411. The raw data 416 undergoes preprocessing in a preprocessing circuit 412. Then, preprocessed image data 417 obtained by carrying out preprocessing in the preprocessing circuit 412 is supplied to a white balance (WB) processing circuit 413. WB processing is then carried out on the preprocessed image data 417 in the white balance (WB) processing circuit 413. The WB processing circuit 413 then outputs its result as WB adjusted image data 418. After WB processing has been carried out in the WB processing circuit 413, the WB adjusted image data 418 is outputted as post-processed image data 419 by undergoing post-processing in a post-processing circuit 414.

It should be noted that when the CCD 403 is in a filter arrangement of a Bayer arrangement, a preferred embodiment is that the preprocessing circuit 412 performs interpolation processing to convert to three plain types of image data of R, G, and B, but there is no limitation to this. Furthermore, the preprocessing circuit 412 may be eliminated from the first camera image processing unit 411.

Furthermore, the post-processing circuit 414 prescribes the bit depth (for example, 12 bits or the like) determined as intermediate raw image data. And when the image data obtained as a result of processing by the WB processing circuit 413 is different from this (for example, 14 bits), a bit shifting process in which bit shifting is performed is conceivable, but there is no limitation to this.

Numeral 415 indicates a second camera image processing unit, which carries out image processing for generating JPEG file 210, which is viewable as a general purpose image data format.

Image processing details of the second camera image processing unit 415 include edge emphasizing processing, color curving processing of high luminance portions, gamma processing for achieving an sRGB color space, and similar processes, and moreover it is preferable that this includes color conversion processing or the like to be as close as possible to the stored colors. However, the second camera image processing unit 415 is constituted by a circuit that is heretofore known and the second camera image processing unit 415 cannot execute the WB readjustments pertaining to the preferred embodiments of the present invention.

It should be noted that in embodiment 1, the process for JPEG compression on the RGB data obtained as a result of image processing for an image for viewing is not performed by the second camera image processing unit 415, but is performed by another circuit not shown in the diagram.

Figure 5:
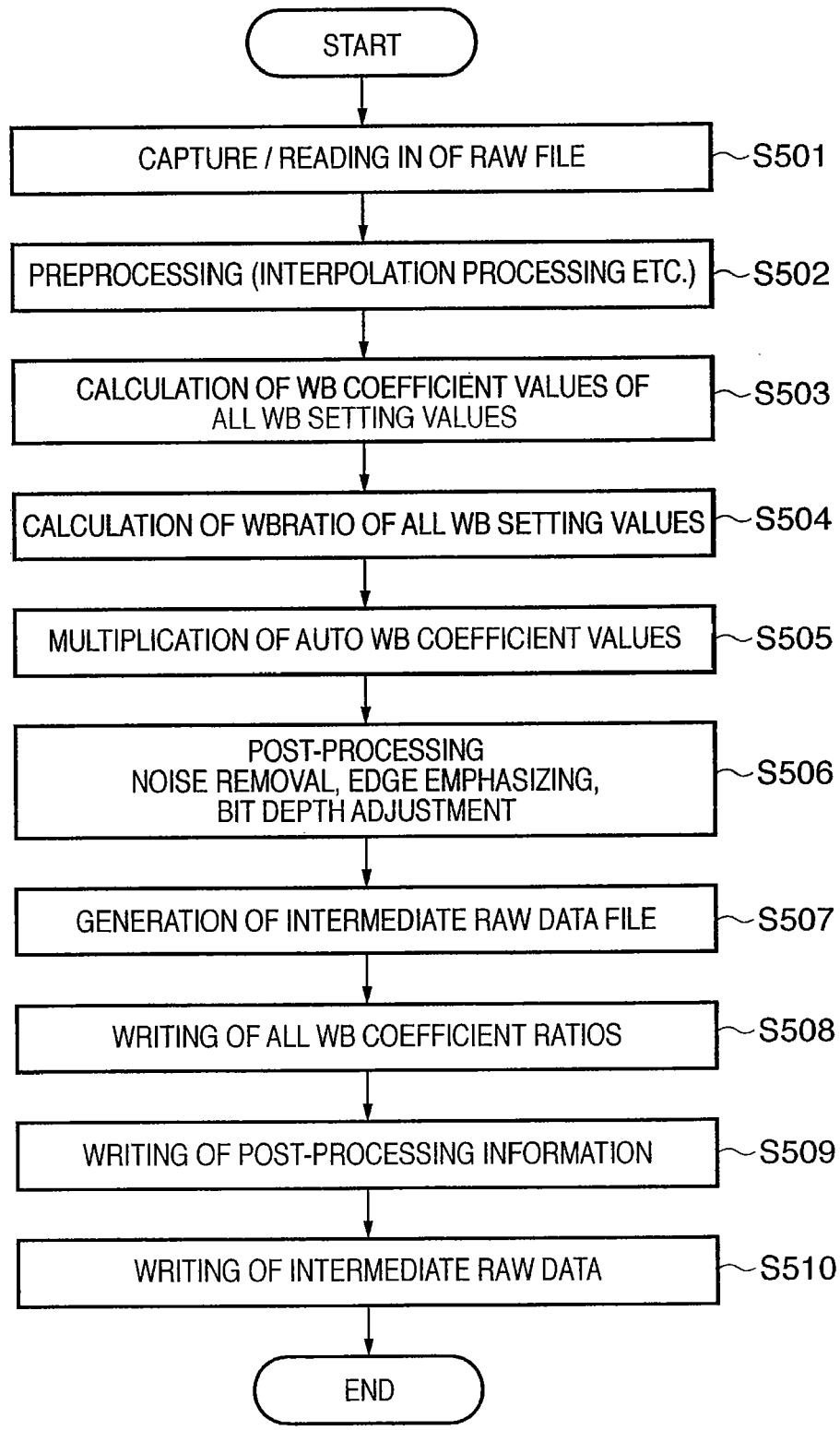
FIG. 5 shows a procedure for generating an intermediate raw data file in an image processing apparatus according to a preferred embodiment of the present invention.
Figure 6:
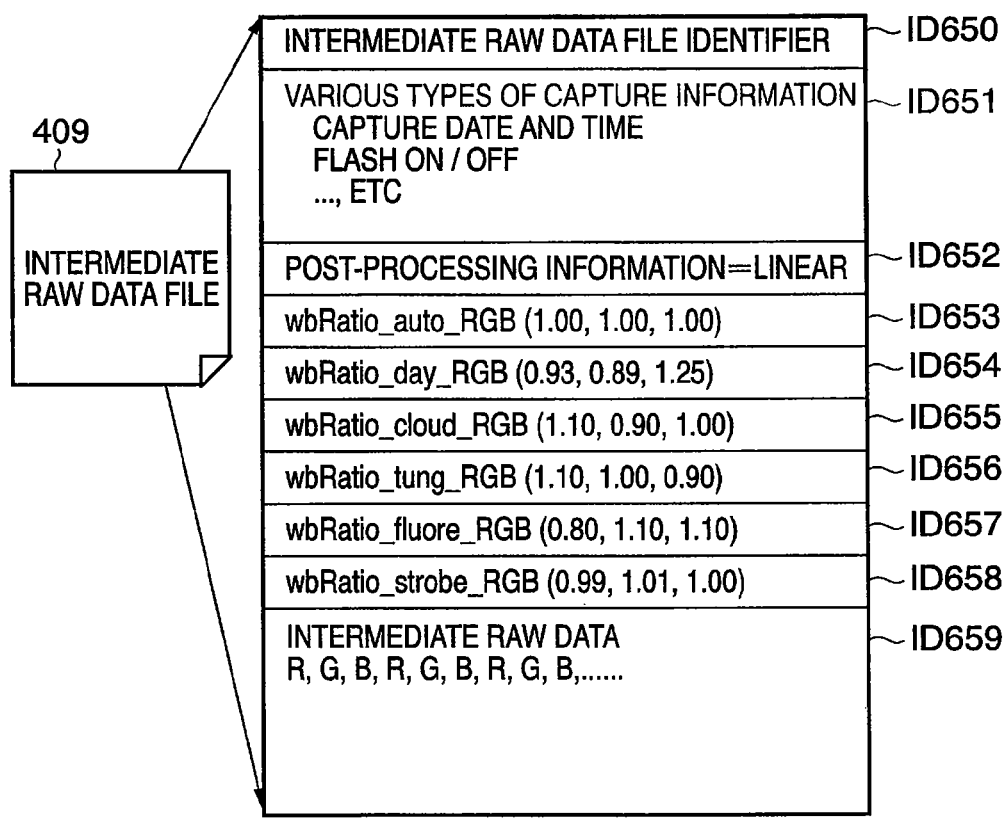
FIG. 6 shows a file format of an intermediate raw data file in an image processing apparatus according to a preferred embodiment of the present invention.

Next, detailed description is given concerning a procedure of generating the intermediate raw data file 409 and a file structure according to embodiment 1 using the "procedure for generating intermediate raw data files" shown in FIG. 5 and "file structure of intermediate raw data file" shown in FIG. 6.

FIG. 5 is a flowchart showing a processing procedure according to the preferred embodiment 1 of the present invention in which capture is carried out by the digital camera 401 and the intermediate raw data file 409 is generated. Next, description is given of a processing procedure in embodiment 1 with reference to FIG. 4 and FIG. 5.

First, when a shutter button (not shown) is pressed by the user on the digital camera 401 after commencement of processing, a subject image obtained through the lens 402 undergoes photo-electric conversion by the CCD 403 in step S501. Then A/D conversion is performed by the A/D conversion circuit 404 and the raw data 416 is inputted to the first camera image processing unit 411.

Next, in step S502, the raw data undergoes preprocessing in the preprocessing circuit 412. In embodiment 1, the CCD 403 is assumed to be in a Bayer arrangement, and by carrying out an interpolation process as preprocessing, three types of plain data of R, G, and B are outputted as the preprocessed image data 417.

Further, in regard to color gain unevenness in each individual digital camera 401, the preprocessing circuit 412 of embodiment 1 references adjustment values stored in a ROM (not shown) to perform a process in which color gain unevenness is normalized. Preprocessing circuit 412 also carries out a subtraction process of optical black.

Next, in step S503, WB coefficient values for all the WB light source settings that can be set in the digital camera 401 are calculated by the WB processing circuit 413. That is, the WB processing circuit 413 calculates all the WB light source setting values. Namely, WB coefficient values for "auto", "day light", "cloud", "tungsten", "fluorescent", and "strobe" are calculated. In the same manner as was described in the conventional example given earlier, the calculation method of WB coefficient values for all the light source settings involves first dividing the preprocessed image data 417 into a plurality of blocks having predetermined widths and heights, then calculating color evaluation values for each block using expression 1 shown earlier.

Next, when color evaluation values (Cx and Cy) are contained in the "white detection area that is preset for each light source", the WB processing circuit 413 assumes such blocks to be white, and integration values (SumR, SumG, and SumB) of each color pixel are calculated respectively for blocks assumed to be white. WB gain for each of the color components of R, G, and B, namely the WB coefficient values kWB_R, kWB_G, and kWB_B, are calculated from the integration values using expression 2 shown earlier.

It should be noted that embodiment 1 is described using a simple calculation algorithm for WB coefficient values as an embodiment in order to facilitate understanding of the invention. However, embodiments are also possible wherein various types of information (Tv values, Av values, strobe light emission/non-light-emission) at the time of capture are referenced. Further, calculation algorithms for very highly precise WB coefficient values may be executed by carrying out shifting or the like of the "white detection area that is preset for each light source" using a result of carrying out capture scene determination from the content of the image data.

When WB coefficient values are calculated for all the light source settings in step S503, processing proceeds to step S504. In step S504, the WB processing circuit 413 calculates ratios wbRatio of WB coefficient values to be used when WB readjustment is performed for all the WB settings.

"wbRatio" refers to a ratio of WB coefficient values for each light source setting and WB coefficient values for the default light source setting, and by multiplying the intermediate raw image data with this at the time of performing WB readjustments, it becomes possible to perform WB readjustments for each setting of light source. For example, when the "default light source setting value=auto", a WB coefficient ratio wbRatio_day for "light source setting value=day" can be obtained as in expression 3 below.

$$wbRatio\_day\_R = kWB\_day\_R/kWB\_auto\_R$$

$$wbRatio\_day\_G = kWB\_day\_G/kWB\_auto\_G$$

$$wbRatio\_day\_B = kWB\_day\_B/kWB\_auto\_B \quad \text{expression 3}$$

More specifically, when the respective WB coefficient values of the auto setting and the day setting are:
kWB_auto_RGB (1.05, 1.15, and 0.80) and kWB_day_RGB (0.98, 1.02, and 1.00), then wbRatio_day_RGB is obtained as follows.

$$wbRatio\_day\_RGB = (0.98/1.05, 1.02/1.15, 1.00/0.80) = (0.93, 0.89, 1.25) \quad \text{expression 4}$$

In the same manner as expression 4 above, wbRatio is calculated also for the other light source settings of "auto", "day light", "cloud", "tungsten", "fluorescent", and "strobe". Below is an example thereof.

wbRatio_auto_RGB=(1.00, 1.00, 1.00)

wbRatio_day_RGB=(0.93, 0.89, 1.25)

wbRatio_cloud_RGB=(1.10, 0.90, 1.00)

wbRatio_tung_RGB=(1.10, 1.00, 0.90)

wbRatio_fluore_RGB=(0.80, 1.10, 1.10)

wbRatio_strobe_RGB=(0.99, 1.01, 1.00)

Next, in step S505, the WB processing circuit 413 executes a WB coefficient value kWB_Default of the default light source setting on the preprocessed image data 417.

Although not shown in the diagrams, in the description provided here, it is assumed that the user has selected "auto" from an operation button or the like provided on the digital camera 401 itself and that the "default light source setting=auto".

Thus, at this time: kWB_Default=kWB_auto_RGB= (1.05, 1.15, 0.80). Consequently, the WB processing circuit 413 performs multiplication on the preprocessed image data 417 by 1.05 for each plain R pixel value, 1.15 for each plain G pixel value, and 0.80 for each plain B pixel value, and outputs the WB adjusted image data 418.

Next, in step S506, post-processing is carried out by the post-processing circuit 414. In embodiment 1, a noise elimination process, a edge emphasizing process, and a bit depth adjustment process are carried out as post-processing, but other processes may be included as necessary. It should be noted that the WB adjusted image data 418 is data having a bit depth of 14 bits for example, while the storage format for the image data in the intermediate raw data file 409 is 12 bits. Further still, the post-processing circuit 414 carries out a 2-bit left shift process on the WB adjusted image data 418 and outputs the post-processed image data 419.

Next, as shown in FIG. 6 and as shown in step S507, the post-processing circuit 414 generates the intermediate raw data file 409 containing the post-processed image data 419 in accordance with a predetermined file naming rule in the storage medium 405. Then, after a raw intermediate file identifier ID 650 and other various types of capture information ID 651 is written, writing to a file at a later stage becomes possible.

It should be noted that the raw intermediate file identifier ID 650 is written to the intermediate raw data file 409 by an unshown writing circuit along with an identifier indicating that the file is intermediate raw image data (for example, "intermediate raw" or the like is written as text). Furthermore, for the various types of capture information ID 651, although there is no problem in using capture information written as file attributes currently by an ordinary digital camera, as a preferred embodiment is preferable that capture information is written as prescribed by the Exif standard.

Next, in step S508 shown in FIG. 5, the WB coefficient ratios wbRatio that were calculated in step S504 are written to the intermediate raw data file 409 for all the light source settings. ID 653 to ID 658 in FIG. 6 show a manner of the WB coefficient ratios that are written in step S508. It should be noted that in embodiment 1 the WB coefficient ratios are written to the intermediate raw data file 409. However, there is no limitation to this, and it is possible that the actual WB coefficient values in the light source setting values are written to the intermediate raw data file 409 and the WB coefficient ratios are calculated in an image processing apparatus such as the PC 407 when WB readjustments are carried out.

Next, in step S509, the information relating to the post-processing carried out by the post-processing circuit 414 is written as post-processing information ID 652 to the intermediate raw data file 409 by the aforementioned unshown writing circuit. It should be noted that writing of the post-processing information to the intermediate raw data file 409 is not essential in embodiment 1. That is, in cases where there is no post-processing information when WB readjustments are carried out on an image processing apparatus side such as the PC 407, processing may be carried out in the post-processing circuit 414 as linear processing.

It should be noted that it is preferable in regard to the post-processing information ID 652 that information indicating whether linear processing or nonlinear processing was carried out in post-processing and, in the case of nonlinear processing, information relating to the processing details thereof and the parameters used be written to the intermediate raw data file 409.

Here, linear processing indicates that there is no major difference in terms of image processing even when the processing order is switched for the WB processing circuit 413 and the post-processing circuit 414. For example, differences in processing due to rounding error in the calculation process are handled as being no difference.

One of the post-processes in embodiment 1 is 2-bit left bit shifting, but since the results match even if the WB coefficient values are multiplied after bit shifting as long as rounding error is removed, "linear processing" is written as the post-processing information.

Furthermore, strictly speaking, the edge emphasizing process and the noise removal process cannot be said to be linear processing. However, with resolution-related processing such as edge emphasizing processing and noise removal processing, there is little effect to image quality in the image resulting from WB readjustment even when a switch in processes occurs when WB readjustments are carried out on the image processing apparatus side such as the PC 407. Accordingly, in embodiment 1, such processing is handled as linear processing.

Questions such as whether to handle edge emphasizing processing and noise removal processing as linear processing or whether to handle them as nonlinear processing, and whether or not to allow this for the various extents of image quality deterioration by switching the processing order are determined by design policy when implementing a generation process for the intermediate raw data file.

Next, in step S510, after the post-processed image data 419 has been written as intermediate raw image data to a region of an ID 659 in the intermediate raw data file 409, a predetermined file closing process is carried out and the procedure for generating intermediate raw data files shown in FIG. 5 is finished. In the above-described manner, the image processing apparatus according to the preferred embodiment 1 of the present invention generates the intermediate raw data file containing intermediate raw data in which the raw data has been processed for the default light source setting and information relating to WB coefficient values pertaining to light source settings other than the default setting of the raw data. In this way, after the capture of raw data, WB readjustment is possible for intermediate raw data that has already once undergone WB processing.

MODIFIED EXAMPLE 1 OF EMBODIMENT 1

Figure 7:
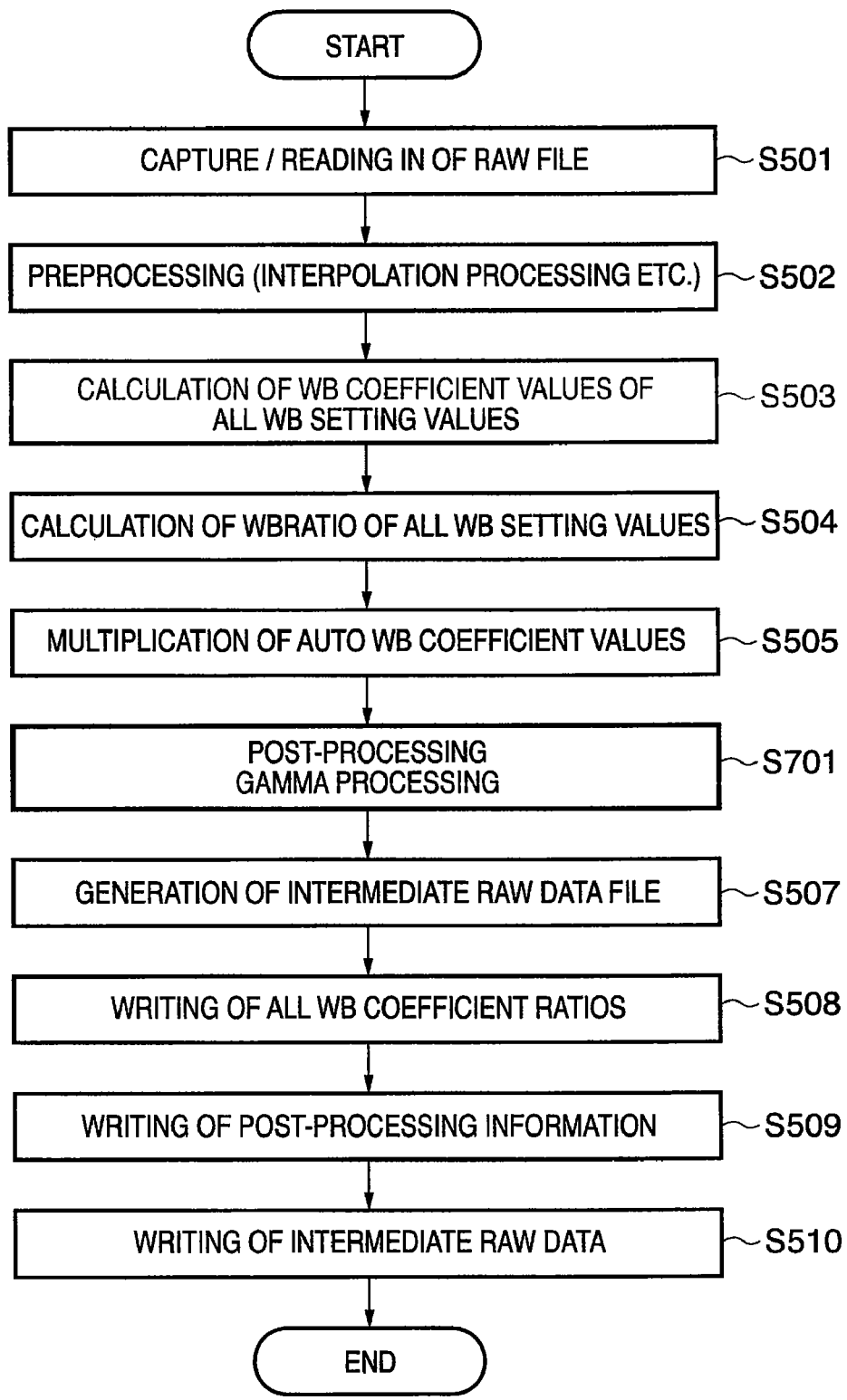
FIG. 7 shows a procedure for generating an intermediate raw data file in an image processing apparatus according to another preferred embodiment of the present invention.

Next, a detailed description is provided concerning a procedure for generating the intermediate raw data file 409 and a file structure according to a modified example 1 of the preferred embodiment 1 of the present invention using FIG. 7 and FIG. 8. Steps and structures other than step S701 in the bold lines in FIG. 7 and an ID 801 in bold lines in FIG. 8 are the same as embodiment 1 and the same reference numbers are used.

In the modified example 1 of embodiment 1, at a post-processing step S701 of FIG. 7, gamma processing is carried out as one example of nonlinear processing. In the present embodiment, gamma processing is carried out as a preferred embodiment to achieve a gamma value of 1/2.2 prescribed in the sRGB color space, which is preferable when image data is displayed as it is on an ordinary CRT monitor.

In this case, in the step of writing post-processing information in step S509, "nonlinear processing, processing details gamma, processing parameter 1/2.2" is written as the post-processing information. An ID 801 in FIG. 8 shows a manner of the "nonlinear processing, processing details gamma, processing parameter 1/2.2" information being written as post-processing information.

Ordinarily gamma processing involves carrying out a calculation such as expression 5 below on all pixel values.

$$Y \text{ (output value)} = X \text{ (input value)}^{\gamma} \quad \text{expression 5}$$

Here the input/output values X and Y use a value normalized on a condition that a maximum value obtainable as a pixel value is 1.0. In the modified example 1 of embodiment 1, processing is carried out with y in expression 5 set to y=1/2.2.

It should be noted in regard to the gamma processing and a process of applying WB carried out by the post-processing circuit 414 in the present embodiment that the value of the intermediate raw image data written to the ID 659 greatly varies when the processing order is switched.

In a case where gamma processing is carried out after WB processing, when a pixel value of a pixel in the preprocessed image data 417 is set to D1 and the WB coefficient value is set to kWB, and a pixel value of the same pixel in the intermediate raw image data of the ID 659 is given as D2, the pixel value D2 is as shown in expression 6.

$$D2 = (D1 \times kWB)^{1/2.2} \quad \text{expression 6}$$

On the other hand, when WB processing is carried out after gamma processing, the pixel values in the preprocessed image data 417 are set to D1 and the WB coefficient values are set to kWB. In this case, when a pixel value of the same pixel in the intermediate raw image data of the ID 659 is set to D3, the pixel value D3 becomes as shown in expression 7 and the values of the pixel value D2 and the pixel value D3 to not match.

$$D3 = kWB \times (D1)^{1/2.2} \quad \text{expression 7}$$

For example, D1=0.5 and kWB=1.2 are substituted into expression 6 and expression 7. In this case, the pixel value D2 becomes approximately 0.79 while the pixel value D3 on the other hand becomes approximately 0.88 such that the pixel values of the same pixels in the intermediate raw image data in the ID 659 vary greatly, and therefore gamma processing is handled as nonlinear processing.

MODIFIED EXAMPLE 2 OF EMBODIMENT 1

A modified example 2 of embodiment 1 is an embodiment in which a PC 407 is set as the image processing apparatus and the model-specific development processing unit, which executes the intermediate raw data generation procedure 200 in FIG. 2, is provided on the PC 407 side. Again, a description is provided with reference to FIG. 4. It should be noted that the various portions and various image processing details in FIG. 4 are executed by an application program installed on the hard disk 420 by being read into a temporary storage medium such as a DRAM (not shown) and successively processed by a CPU (not shown).

As described earlier, the PC 407 in FIG. 4 is capable of sending and receiving data to and from the digital camera 401 through the communications medium 406 such as a USB cable. The PC 407 receives the raw file 408 and the intermediate raw data file 409 and the like, which are generated by the digital camera 401, through the communications medium 406. These can then be stored as a raw image file 421 and an intermediate raw data file 422 on the hard disk 420.

It should be noted that although not shown in the drawings, image data of the JPEG file 410 can also be stored in the same manner on the hard disk 420. In this case, the JPEG file 410 is a general purpose file. Thus, it can be converted to an output format of a display device 436 (for example RGB data in the present embodiment) by image processing software that is incorporated as standard on the PC 407 and displayed on the display device 436 as an image for viewing.

Numeral 450 indicates a first PC image processing unit corresponding to the model-specific development processing unit executed in the image processing apparatus according to the preferred embodiment of the present invention as was described in FIG. 2, and is capable of executing the same image processing as the first camera image processing unit 411 contained in the digital camera 401. That is, image processing is carried out on the raw file 421 by the first PC image processing unit 450 to generate an intermediate raw data file 422. The first PC image processing unit 450 is provided with functions of a preprocessing circuit 451, a WB adjustment circuit 452, and a post-processing circuit 453.

Suppose that a user who has saved image data as a raw file using menu settings in the digital camera 401 later desires to change this to an intermediate raw data file. In this case, the intermediate raw data file 422 can be obtained using the first PC image processing unit 450. The first PC image processing unit 450 operates in the same manner as the first camera image processing unit 411 contained in the digital camera 401. That is, an intermediate raw data file containing intermediate raw data in which the raw data has been processed for the default light source setting and information relating to WB coefficient values pertaining to light source settings other than the default setting of the raw data are generated as the intermediate raw data file 422.

<Embodiment 2>

Next, a description is given of an image processing apparatus according to a preferred embodiment 2 of the present invention. Numeral 423 indicates a maker-provided image processing unit and indicates a processing circuit of conventional techniques having a second image processing portion 429 in which image processing is carried out in the same manner as the second camera image processing unit 415 of the digital camera 401. Conventionally, in specialized development processing software on an ordinary PC, processing is carried out by the first PC image processing unit 450 and the second image processing portion 429 of the maker-provided image processing unit 423, which fulfill a role as a converter of the raw file 421. In this way, conversion processing was carried out to a general purpose image having the same picture quality as the JPEG file 410 from the raw file 421. A dotted line 424 indicating a data flow shows a processing flow of a conventional example.

On the other hand, a circuit that carries out WB readjustments is incorporated in the image processing unit according to the preferred embodiment 2 of the present invention. That is, a maker-provided image processing unit 426 is provided corresponding to the general purpose development processing unit in FIG. 3 and the WB readjustment procedure 300 of FIG. 3 is executed.

In other words, in the image processing apparatus of the preferred embodiment 2 of the present invention, a maker-provided image processing unit 426 is arranged that is provided by the maker of the digital camera 401 for example. The maker-provided image processing unit 426 is provided with a WB readjustment circuit 427 and a second image processing portion 428 that carries out image generation processing in the same manner as the second camera image processing unit 415 of the digital camera 401. In this way, general purpose image data can be outputted having the same picture quality as the JPEG file 410 from the intermediate raw data file 422. Further, since the maker-provided image processing unit 426 is provided with the WB readjustment circuit 427, WB readjustments can be carried out as necessary on the intermediate raw data file 422.

It should be noted that the image processing details of the maker-provided image processing units 423 and 426 are important features in determining the picture quality of the digital camera 401, and therefore these processing details are normally not disclosed by the digital camera maker. Consequently, information relating to the maker-provided image processing units 423 and 426 is handled in the present embodiment as information that cannot be obtained from a third party (a so-called ISV: independent software vender).

MODIFIED EXAMPLE 1 OF EMBODIMENT 2

Unlike embodiment 2, in a modified example 1 of the preferred embodiment 2 of the present invention, a second PC image processing unit 425 is provided that executes image retouching software developed by a third party. The second PC image processing unit 425 corresponds to the general purpose development processing unit described in FIG. 3 of the present application. The second PC image processing unit 425 is provided with functions of a WB readjustment circuit 430, a luminosity adjustment circuit 431, a tone adjustment circuit 432, a color correction circuit 433, and an APC related processing circuit 434. Accordingly, as well as picture quality adjustments such as WB readjustments, luminosity adjustments, tone adjustments, and color corrections carried out on the intermediate raw data file 422, predetermined image processing is carried out to output general purpose image data. And the second PC image processing unit 425 has image processing algorithms and processing techniques different from the maker-provided image processing unit 426.

The second PC image processing unit 425 may execute software developed by the maker of the digital camera 401, but in the present embodiment, it executes image retouching software developed by a third party that develops/markets software. Consequently, as shown in FIG. 4, a plurality of these may be provided for each third party that develops/markets software.

In a case where image retouching software is developed by a third party, it is assumed that the internal structure of the intermediate raw data file of FIG. 6 is a publicly disclosed structure so that the third party can interpret the intermediate raw data file. Furthermore, the second PC image processing unit 425 may or may not have an image viewing function, but it is necessary that it is configured as software capable of at least carrying out readjustments relating to WB.

Figure 13:
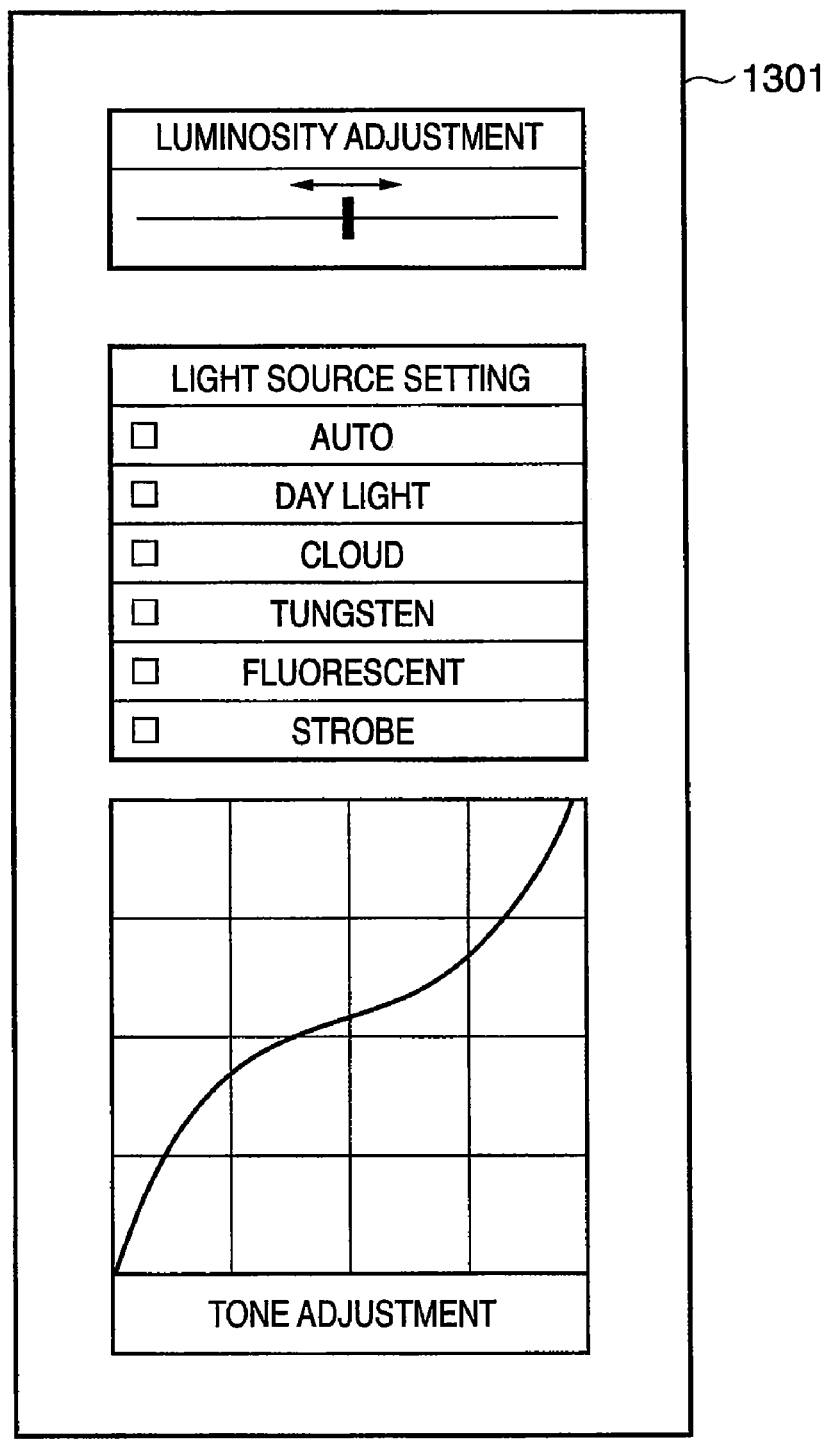
FIG. 13 shows an example of a user interface in an image processing apparatus according to a preferred embodiment of the present invention.

Numeral 1301 of FIG. 13 is one example of an image quality adjustment panel of a UI (user interface) that is displayed on the display device 436 of FIG. 4. The user operates a "light source setting" checkbox of the image quality adjustment panel 1301 and for example changes the setting from the default "auto" to another light source. Then, in the second PC image processing unit 425, the WB readjustment circuit 430 carries out WB readjustment processing, which is described later. Then, after this, luminosity adjustments, tone adjustments, color corrections, and moreover APC (edge emphasizing) related processing and the like are carried out in response to the other control conditions of the image quality adjustment panel 1301, after which general purpose image data is outputted.

Figure 9:
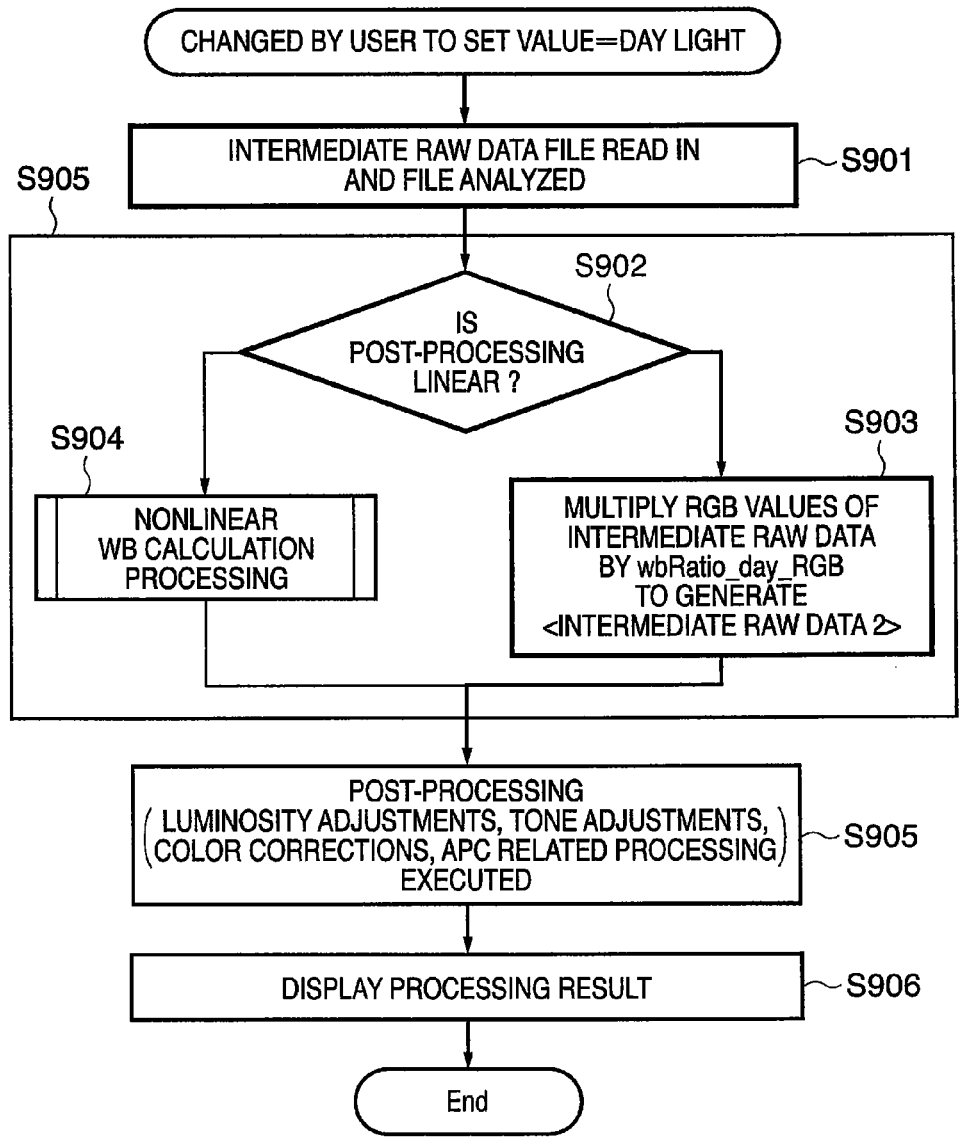
FIG. 9 shows a processing procedure of WB readjustment at a time of linear post-processing in an image processing apparatus according to a preferred embodiment of the present invention.
Figure 10:
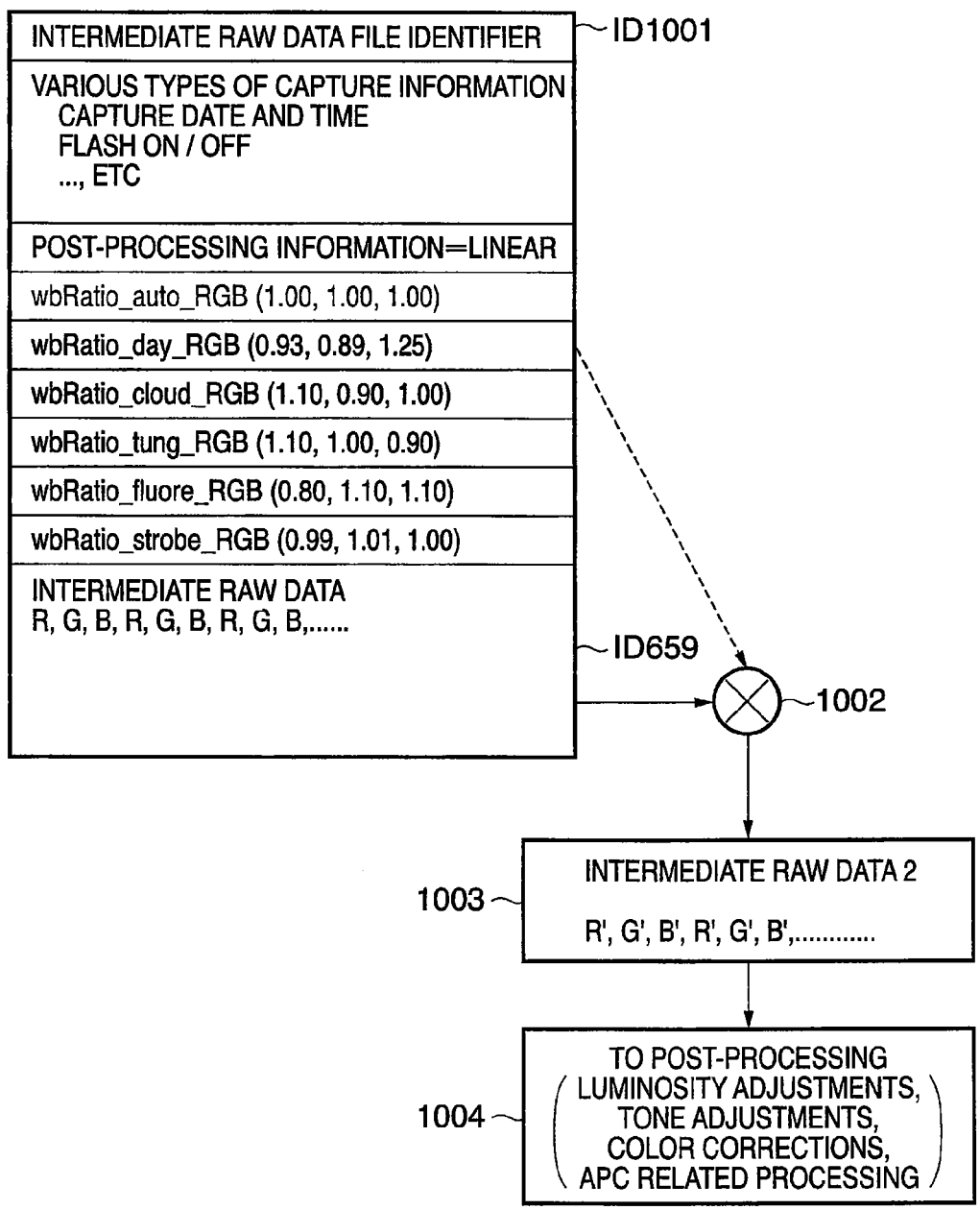
FIG. 10 is a diagram for describing a processing procedure of WB readjustment at a time of linear post-processing with a circuit configuration in an image processing apparatus according to a preferred embodiment of the present invention.

Next, a description is given using FIG. 9 and FIG. 10 concerning a WB readjustment processing procedure (at a time of linear post-processing) in an image processing apparatus according to modified example 1 of the preferred embodiment 2 of the present invention using the second PC image processing unit 425. Here, detailed description is given taking as an example a case where the user readjusts the WB setting from the "auto" setting at the time of capture to "day light". It should be noted that the following is described as modified example 1 of embodiment 2 but this may be executed in the same manner in the earlier embodiment 2.

In FIG. 10, an ID 1001 shows an internal structure of the intermediate raw data file and is completely the same as FIG. 6. When the user inputs a command for readjusting the WB setting from "auto" to "day light", a PC 407 according to the present embodiment analyzes the intermediate raw data file 422. Then the values of an RGB WB coefficient ratio wbRatio_day_RGB for day light are referenced and these values are multiplied by the "intermediate raw data" of an ID 659 by a multiplication circuit 1002 of FIG. 10, thereby obtaining "intermediate raw data 2" indicated by numeral 1003 as WB readjusted data.

The "intermediate raw data 2" obtained as output of the WB readjustment circuit 430 is sent to a later stage processing circuit 1004, then after various processing is carried out by the luminosity adjustment circuit 431, the tone adjustment circuit 432, the color correction circuit 433, and the APC related processing circuit 434 of FIG. 4, is displayed on the display device 436.

Next, more detailed description is given of this processing procedure using the flowchart of FIG. 9. It should be noted that in the flowchart of FIG. 9, the area indicated by step S905 refers to the processing details of the WB readjustment circuit 430.

The user has changed the WB light source setting value from "auto" to "day light" by operating the image quality adjustment panel 1301. Then, in step S901, the second PC image processing unit 425 reads in the intermediate raw data file 422 from the hard disk 420. Then, the details of the intermediate raw data file 422 that has been read in is analyzed so that the post-processing information ID 652, the day light WB coefficient ratio ID 654 and the "intermediate raw data" of ID 659 can be referenced.

Next, in step S902, the post-processing information is referenced and a determination is made as to whether or not this is linear processing or nonlinear processing. In the present embodiment, this is "linear" as shown by an internal structure ID 1001 of the intermediate raw data file and therefore processing proceeds to step S903. On the other hand, in a case where the post-processing information is "nonlinear", a nonlinear WB calculation process is carried out in step S904.

In step S903, the WB coefficient ratios for day light (wbRatio_day_RGB=[0.93, 0.89, 1.25]) are multiplied by all the pixel values of the "intermediate raw data" of the ID 659, and the "intermediate raw data 2" indicated by numeral 1003 in FIG. 10 is outputted. After later stage processing is carried out on the "intermediate raw data 2" such as luminosity adjustments, tone adjustments, color corrections, and APC related processing in step S905, a processing result is displayed on the display device 436 in step S906 and the present processing procedure is finished.

With the above-described embodiment, high precision WB readjustment processing can be executed on the intermediate raw data file 422 using the PC 407 making use of model-specific development processing algorithms and parameters of the digital camera 401 which are provided by the third party.

MODIFIED EXAMPLE 2 OF EMBODIMENT 2

Processing details of the WB readjustment circuit 430 will now be described in the case where the post-processing information ID 652 written into the intermediate raw data file 422 is "nonlinear" in an image processing apparatus according to a modified example 2 of embodiment 2 with the same configuration as the image processing apparatus of the modified example 1 of embodiment 2.

In the case of nonlinear processing, the PC 407, which is the image processing apparatus according to modified example 2 of embodiment 2, obtains the post-processing information ID 652 of the intermediate raw data file 422. Then, inverse calculation processing is executed on the "intermediate raw data" by referencing the details and parameters of the nonlinear processing. "Second intermediate raw data" obtained by the inverse calculation processing is a processing result of the WB adjustment circuit 413 in the digital camera 401. Accordingly, by multiplying the "second intermediate raw data" by the WB coefficient ratios, "third intermediate raw data" can be obtained as a result of WB readjustments.

Next, in the image processing apparatus according to modified example 2 of embodiment 2, "fourth intermediate raw data" is obtained by reapplying gamma processing, which is originally to be executed. The obtained "fourth intermediate raw data" is inputted and a result of carrying out later stage processing (luminosity adjustments, tone adjustments, color corrections, and APC related processing) on the inputted fourth intermediate raw data is outputted to the display device 436 and displayed.

Figure 11:
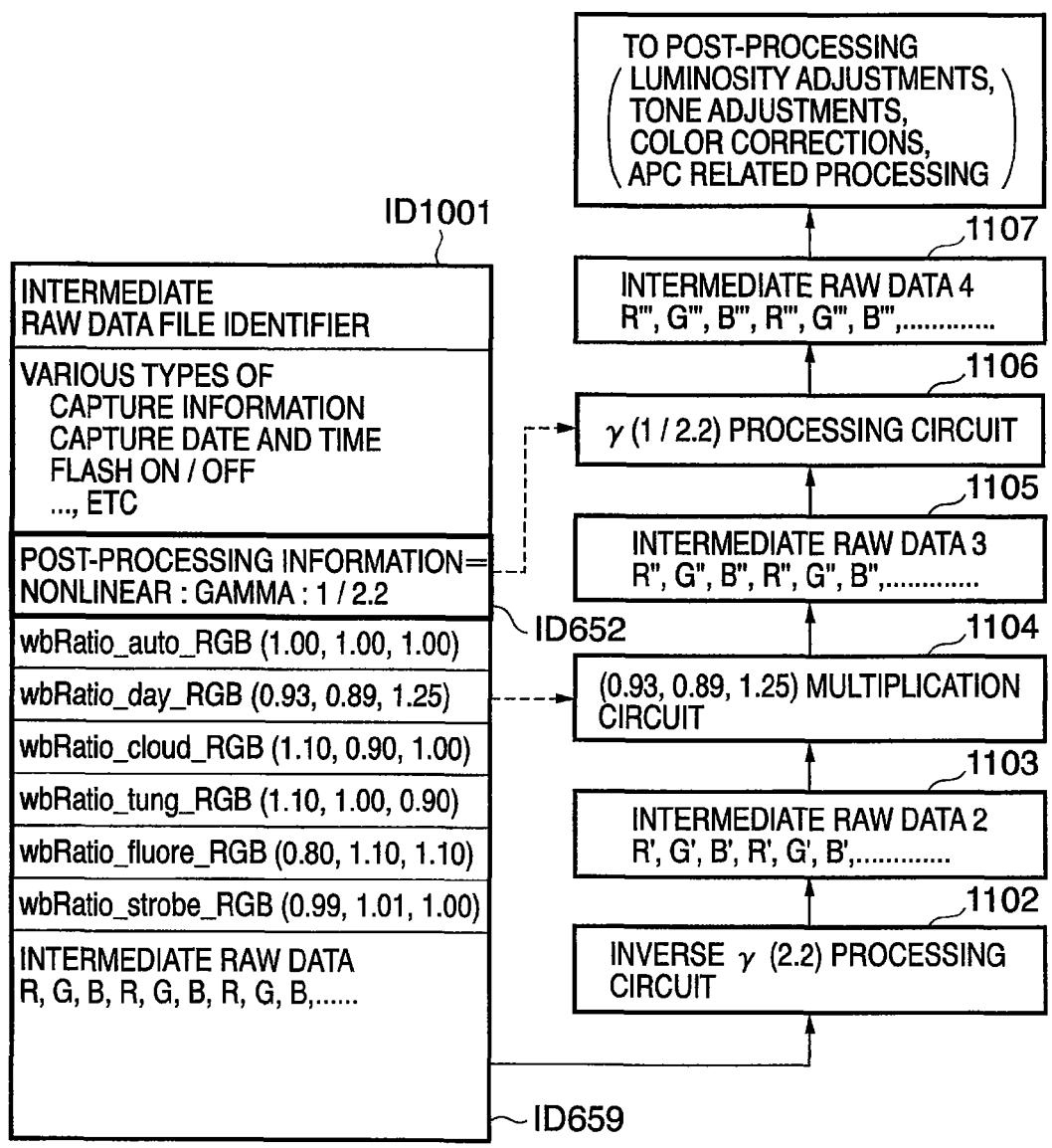
FIG. 11 is a diagram for describing a processing procedure (when gamma=1/2.2) of WB readjustment at a time of linear post-processing with a circuit configuration in an image processing apparatus according to a preferred embodiment of the present invention.
Figure 12:
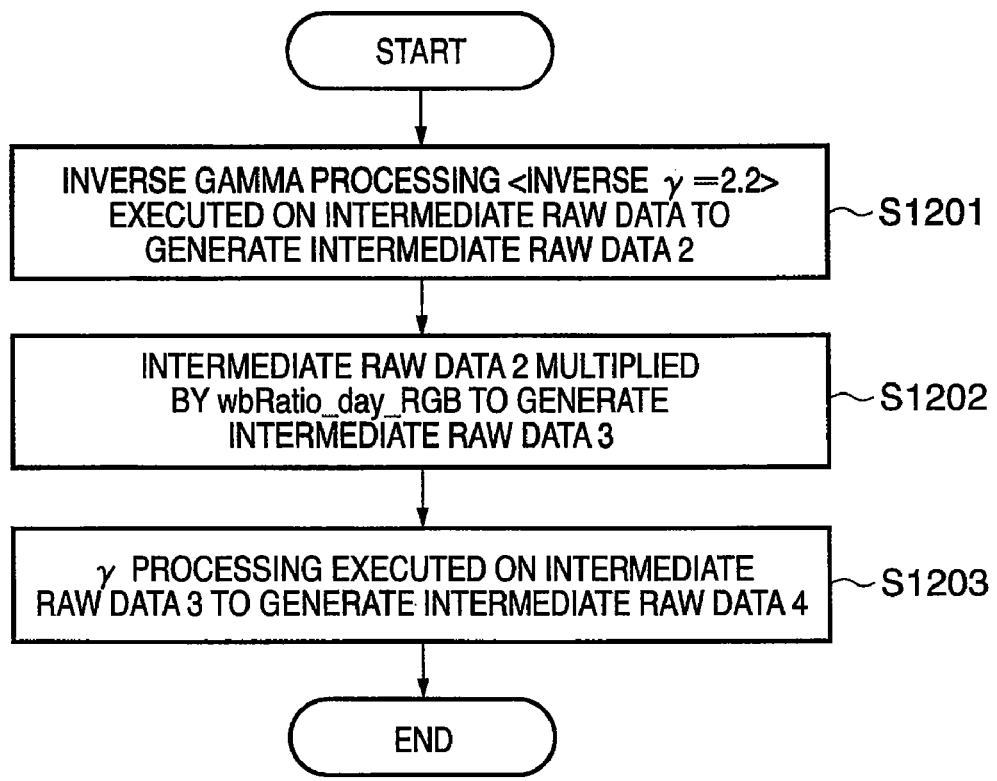
FIG. 12 shows a processing procedure (when gamma=1/2.2) of WB readjustment at a time of nonlinear post-processing in an image processing apparatus according to a preferred embodiment of the present invention.

FIG. 11 and FIG. 12 show a WB readjustment processing procedure (step S904 in FIG. 9) in the case where nonlinear gamma processing has been carried out by the post-processing circuit 414 of the digital camera 401. Next, a detailed description is given using FIG. 9 and FIG. 10 concerning the processing procedure of a WB readjustment processing step S904 in the case where the post-processing information ID 652 is "nonlinear".

When nonlinear gamma processing has been carried out, "post-processing information=nonlinear: gamma 1/2.2" is written in the post-processing information ID 652 of the intermediate raw data file as shown in FIG. 11. In this case, first a process is carried out of inverse gamma processing (gamma value 2.2) by an inverse gamma processing circuit 1102 on the intermediate raw data file 422 to obtain the "intermediate raw data 2" indicated by numeral 1103. Next, a multiplication process is carried out by a multiplication circuit 1104 with the wbRatio_day_RGB to obtain the "intermediate raw data 3" indicated by numeral 1105. Then, gamma (1/2.2) processing is carried out by the gamma processing circuit 1106, which carries out the same processing as the processing details of the post-processing circuit 414 of the digital camera 401 on the "intermediate raw data 3". Then "intermediate raw data 4" indicated by numeral 1107 is obtained, which is input data of the luminosity adjustment circuit 431. The "intermediate raw data 4" subsequently undergoes later stage processing such as luminosity adjustments, tone adjustments, color corrections, and APC related processing in the second PC image processing unit 425.

Next, more detailed description is given concerning an operation of the image processing apparatus according to the modified example 2 of embodiment 2 using the flowchart of FIG. 12. First, in step S1201, inverse gamma processing as shown by expression 8 below is carried out on the "intermediate raw data" of the ID 659 to obtain the "intermediate raw data 2" indicated by numeral 1103.

Pixel value of "intermediate raw data 2"=(pixel value of "intermediate raw data")$^{2.2}$ expression 8

Next, in step S1202, a multiplication process with the wbRatio_day_RGB WB coefficient ratio is carried out on the "intermediate raw data 2" indicated by numeral 1103 to obtain the "intermediate raw data 3" indicated by numeral 1105. Next, in step S1203, gamma processing as shown by the expression below is carried out on the "intermediate raw data 3" indicated by numeral 1105 to obtain the "intermediate raw data 4" indicated by numeral 1107.

Pixel value of "intermediate raw data 4"=(pixel value of "intermediate raw data 3")$^{1/2.2}$ expression 9

After the "intermediate raw data 4", which is indicated by numeral 1107 and obtained by the gamma processing shown in expression 9, undergoes the processing of step S905 in FIG. 9 as inputted image data of a later stage processing circuit, the processing result is displayed on the display device 436.

With the image processing apparatus according to modified example 2 of the preferred embodiment 2 of the present invention, even with nonlinear processing such as gamma processing of the post-processing circuit 414 of the digital camera 401, highly precise WB readjustment processing can be executed by the PC 407. It should be noted that when there is no effective inverse process for the nonlinear post-processing, it is naturally effective to make selection of light sources unavailable at a stage where the light source setting is to be selected.

Naturally, image processing apparatuses according to the above-described embodiments 1 and 2 as well as their modified examples can be combined and executed as appropriate.

<Other Embodiments>

Furthermore, an object of the embodiments of the present invention may be achieved by providing to a system or an apparatus a storage medium (or a recording medium) on which a computer program containing program code of software that achieves the functionality of the foregoing embodiments is stored. In these cases, the object can be achieved by a computer (or a CPU or MPU or the like) of the system or apparatus reading out and executing the computer program stored on the storage medium. And the actual computer program that is read out from the storage medium achieves the functionality of the foregoing embodiments, such that the storage medium on which the computer program is stored constitutes the present invention.

Furthermore, the functionality of the foregoing embodiments is achieved by having a computer execute the computer program that has been read out. For example, the steps shown in FIGS. 5 and/or 7 can be performed by a program loaded into image processing unit 411 in a digital camera. The digital camera can be provided with a memory (not shown) for storing such a program. Similarly the steps shown in FIG. 9  and/or 12 can be performed by a program loaded into image processing unit 425 in a personal computer from a storage unit such as hard disc 420.

Further still, an operating system (OS) or the like that runs on a computer may carry out a part or all of the actual processing according to instructions of the program code of the computer programs. And of course this includes cases where the functionality of the foregoing embodiments is achieved by this processing.

Further, it is possible for the program code of the computer program read out from the storage medium to be written onto a memory provided in an extension card inserted into the computer or an extension unit connected to the computer. And naturally this may also include having a CPU or the like provided in the extension card or extension unit subsequently carry out a part or all of the actual processing according to instructions of the program code such that the functionality of the foregoing embodiments is achieved by the processing.

When an embodiment of the present invention is applied to the aforementioned storage medium, a computer program containing program code corresponding to the flowcharts described earlier is contained in the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-291721, filed Oct. 26, 2006, which is hereby incorporated by reference herein in its entirety.

What is claimed is:

1. An image processing apparatus, comprising:
    a first white balance coefficient value calculation unit configured to calculate a first white balance coefficient value for a first light source that has been set in relation to raw data, using a white detection area that is preset for the first light source and color evaluation values of the raw data;
    a second white balance coefficient value calculation unit configured to calculate a second white balance coefficient value for a second light source other than the first light source in relation to the raw data, using a white detection area that is preset for the second light source and the color evaluation values of the raw data;
    an intermediate raw data generation processing unit configured to generate intermediate raw data by applying the first white balance coefficient value to the raw data and to perform post-processing including at least one process of noise removal, edge emphasizing, and bit depth adjustment to the generated intermediate raw data; and
    a storage unit configured to store as white balance information, information capable of specifying the second white balance coefficient value, and as post-processing information, information relating to the post-processing that has already been performed to the generated intermediate raw data by the intermediate raw data generation processing unit, associated with the post-processed generated intermediate raw data.

2. The image processing apparatus according to claim 1, in which the white balance information is a value that mutually associates the first white balance coefficient value and the second white balance coefficient value.

3. The image processing apparatus according to claim 2, in which the value that mutually associates the first white balance coefficient value and the second white balance coefficient value is a ratio of the first white balance coefficient value and the second white balance coefficient value.

4. The image processing apparatus according to claim 1, in which the white balance information is the second white balance coefficient value.

5. The image processing apparatus according to claim 1, in which the post-processing information includes information indicating linear processing or nonlinear processing.

6. An image processing apparatus control method, comprising the steps of:

calculating a first white balance coefficient value for a first light source that has been set in relation to raw data, using a white detection area that is preset for the first light source and color evaluation values of the raw data;

calculating a second white balance coefficient value for a second light source other than the first light source in relation to the raw data, using a white detection area that is preset for the second light source and the color evaluation values of the raw data;

generating intermediate raw data by applying the first white balance coefficient value to the raw data and by performing post-processing including at least one process of noise removal, edge emphasizing, and bit depth adjustment to the generated intermediate raw data; and storing as white balance information, information capable of specifying the second white balance coefficient value, and as post-processing information, information relating to the post-processing that has already been performed to the generated intermediate raw data in the intermediate raw data generating step, associated with the post-processed intermediate raw data.

7. A computer program stored in a computer-readable storage medium that executes on a computer the steps of the image processing apparatus control method according to claim 6.

* * * * *